United States Patent [19]

Posso

[11] 4,428,013
[45] Jan. 24, 1984

[54] DEVICE FOR GRIPPING A MAGNETIC DISK CARTRIDGE

[75] Inventor: Patrick Posso, Lausanne, Switzerland

[73] Assignee: GEFITEC S.A., Lausanne, Switzerland

[21] Appl. No.: 280,879

[22] Filed: Jul. 6, 1981

[30] Foreign Application Priority Data

Jul. 16, 1980 [FR] France ............................. 80 15687

[51] Int. Cl.³ .................. G11B 23/02; B65D 85/30
[52] U.S. Cl. .................................. 360/133; 206/444
[58] Field of Search ........................ 360/131–133; 206/444

[56] References Cited

U.S. PATENT DOCUMENTS 4,235,339 11/1980 Christensen et al. ............ 260/444
4,253,129 2/1981 Butz et al. ...................... 360/133

FOREIGN PATENT DOCUMENTS

1200572 7/1970 United Kingdom ............ 360/133

Primary Examiner—Robert L. Richardson
Attorney, Agent, or Firm—Arthur B. Colvin

[57] ABSTRACT

The invention relates to a device for gripping a magnetic disk cartridge which comprises a pivot piece resting freely and selectively on the lid by one of its faces and by its rounded edge forming sliding pivot; each rod fast with the extractor plate presents in lateral projection a spindle located in a housing which is made in the pivot piece, opening in a slot and comprises an open end bearing for the spindle of the rod in question, the distance "D" being greater than the distance "d"; springs maintain the rod spindles elastically in said bearings.

5 Claims, 18 Drawing Figures

DEVICE FOR GRIPPING A MAGNETIC DISK CARTRIDGE

The present invention relates to a device for gripping a magnetic disk cartridge.

Magnetic disks for computers are packaged in the inner cavity of a container closed by a lid and the cartridge thus constituted is known as a disk-pack. The disk is imprisoned between a clamping plate and a locking plate cooperating with permanent magnets carried by the bottom of the container. In the chamber made between these two plates is housed an extractor plate, with sufficient axial clearance, which, when it is brought towards the lid, provokes disconnection of the locking plate relatively to the permanent magnets and, when this lid is manoeuvred by means of a handle, enables the disk with said lid to be extracted.

The present invention relates to improvements in the device for gripping the cartridge due to which the above-mentioned operations may be carried out automatically from the outside.

Such a gripping device may comprise a mechanism including a piece coupled by at least one rod to the extractor plate and mounted to pivot in the handle to which it is adapted to be connected, to extract the disk, by a pawl mounted to slide in said handle and making it possible to place said mechanism in retracted position and a position for gripping.

It is an object of the present invention, whilst allowing execution of the two operations of gripping the cartridge as a whole and of gripping the disk suspended from the lid after separation from the container, to render dismantling and re-assembly of the gripping device very rapid and convenient for any one, without the aid of any tool, whilst ensuring virtually perfect solidity, safety and reliability of this device. Subsidiarily, it aims at a simplified design such that the number of component parts is reduced and that most of them, particularly those of complex shape due to the multiplicity and dependence of the functions that they perform, can be manufactured from plastics material with precision and without particular difficulties. This obviously allows automated mass production of which the manual assembly operations are reduced both in importance and skill and in duration, such production then leading to a substantial reduction in the cost price and to a homogeneity in the quality of the cartridges thus produced.

To attain this purpose and in accordance with the invention, the said piece is pivoting and in elastic abutment on the lid against which it rests freely by one of its faces in the closed position for carrying and by its rounded edge forming sliding pivot in the open position for extraction, the handle not bearing on said lid; the or each of the rods guided in substantially coaxial translation through the lid presents, in lateral projection, at least one spindle located above this lid and in a housing made in the pivoting piece opening in a slot therein provided for the relative free movement of the rod in question when said piece is pivoted; the housing presents a part substantially perpendicular to the bearing face of the pivoting piece and extended by a hook-shaped return of which the bottom end constitutes an open bearing for the rod spindle in question, the distance from the rounded edge to the opposite contact surface of the bearing being greater than the distance to the bearing face from the opposite contact surface of the bearing by an amount sufficient to detach the locking plate relatively to the or each magnet; and at least one spring interposed between the lid and the extractor plate tending to move them apart, elastically maintains the or each rod spindle in the or each bearing, mentioned above, of the pivoting piece.

According to a particularly important feature of the invention, due to which the connection of the pivoting piece with the or each rod of the extractor plate is positive, sure and reliable whilst possessing a remarkable freedom of disconnection, the inlet of the or each bearing of the pivot piece is constituted by a constriction of the return of the housing, this constriction being defined by two elastically deformable noses located in a plane substantially parallel to the one passing through the contact surfaces of the bearing in question, opposite the rounded edge and the bearing face so that, on exerting a driving thrust of the rod or rods relatively to the pivot piece and combining it with a thrust of translation thereof on the lid, this provokes, depending on the direction of this translation, the automatic engagement with elastic locking of the or each spindle in the or each bearing or the automatic disengagement with elastic unlocking of said spindle from said bearing.

The invention will be more readily understood on reading the following description with reference to the accompanying drawings, in which.

Figure 1:
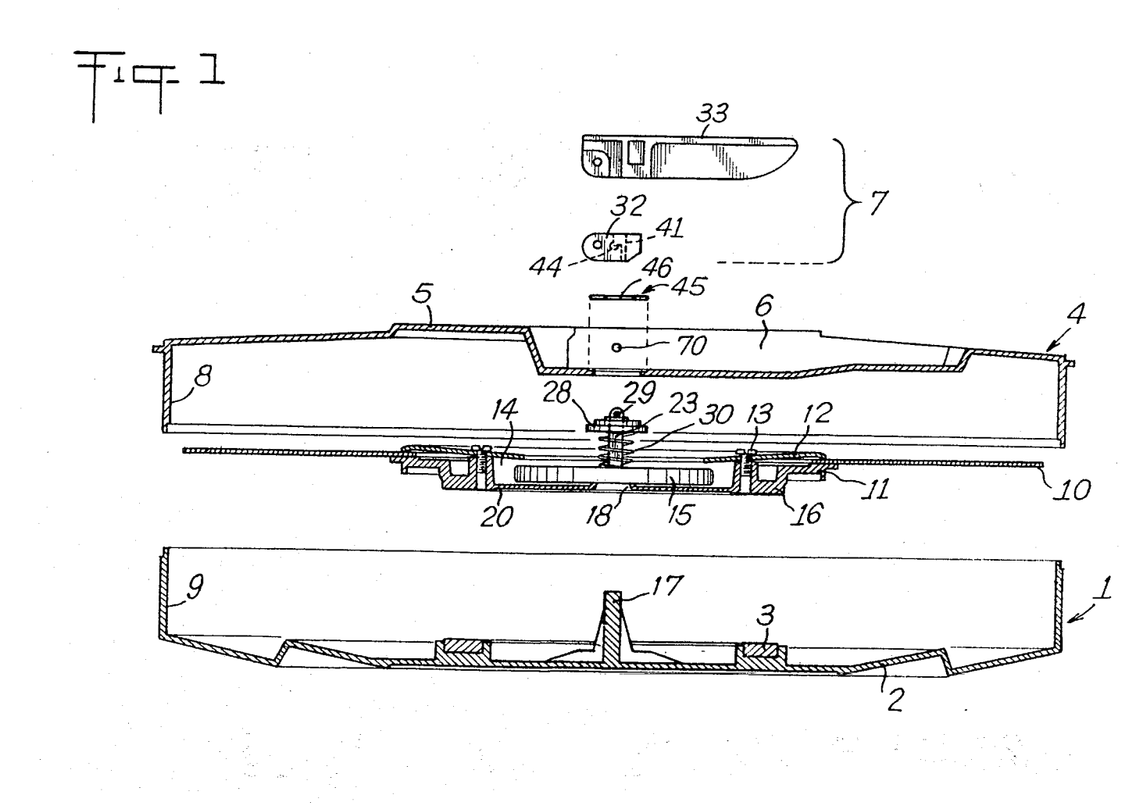
FIG. 1 is an elevation in section of the cartridge showing, in synoptic view, the components thereof.

Referring now to the drawings, the cartridge comprises, as may be seen in FIG. 1, a container 1 of which the sectioned bottom 2 is provided with a central magnetized ring 3 or possibly magnetized pellets distributed in equiangular and equipolar manner in this central zone. It also comprises a lid 4 of which the top 5 defines a recess 6 for housing the visible part of the gripping device 7 according to the invention, described hereinafter. The lid 4 is fast with an annular skirt 8 normally fitted for centering thereof in the tubular peripheral wall 9 of the container 1 on the upper edge of which which the marginal edge of the lid 4 rests.

The cartridge further comprises a magnetic disk 10, of coronal form, adapted to store data. The disk is imprisoned, in its central part, between a lower locking plate 11 and an upper clamping plate 12, the latter being elastically deformable and connected to the preceding one by screws 13. A central chamber 14 defined by these plates contains an extractor plate 15 which is prisoner, freely and with an appreciable axial clearance.

Figure 8:
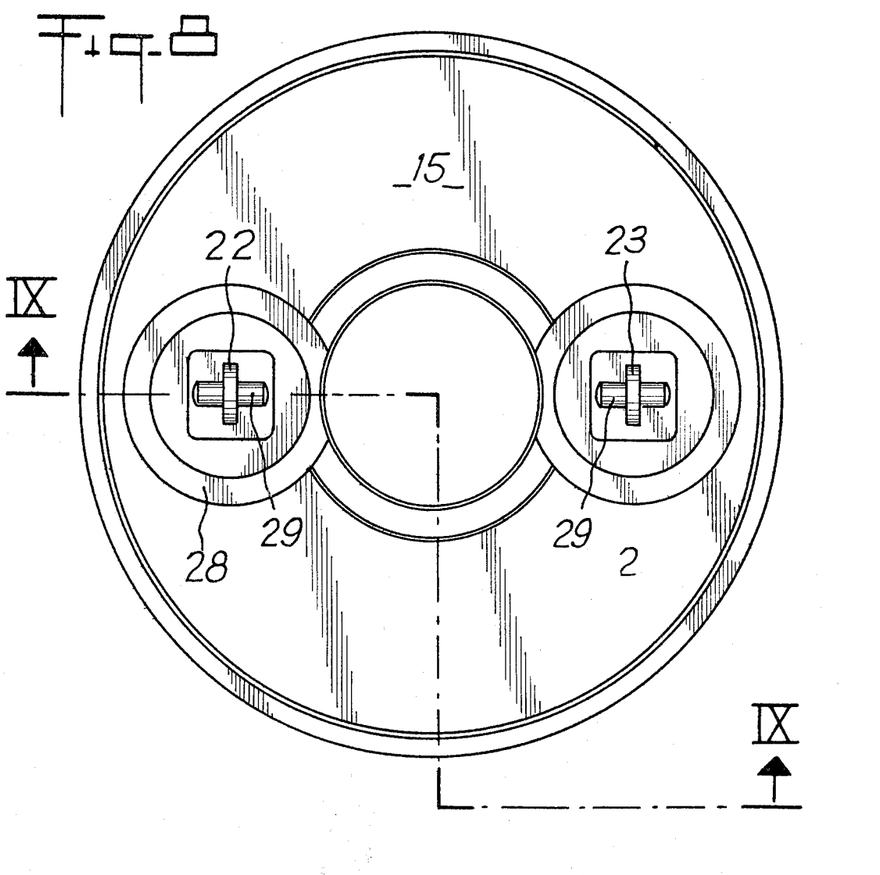
FIG. 8 is a plan view from above of the extractor plate equipped with its rods, spindles, springs and caps.
Figure 9:
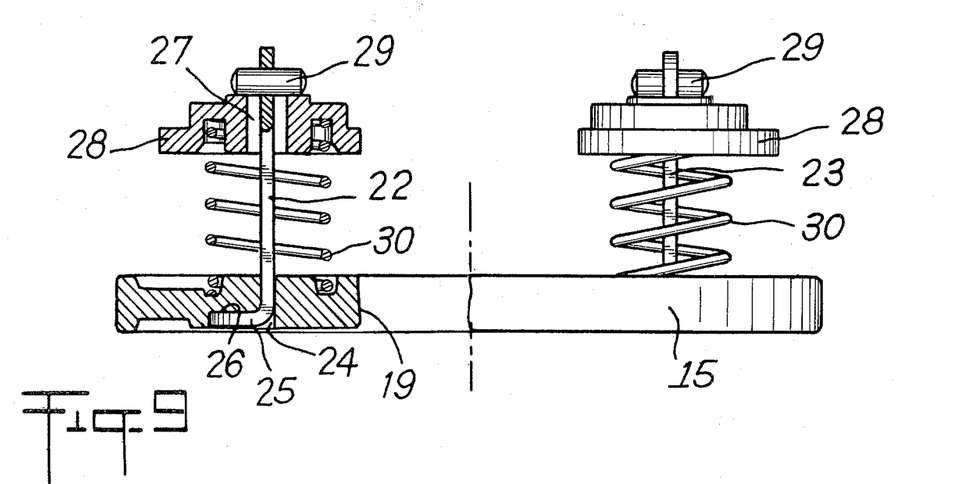
FIG. 9 is an elevation in section taken along line IX—IX of FIG. 8.

The lower locking plate 11 presents a projecting ring 16 adapted to cooperate with the or each magnet 3 to ensure connection of the mobile equipment bearing the disk 10 with the container 1. Moreover, the bottom 2 of the container is provided with a centering finger 17 which normally passes through an orifice 18 in the connecting ring 16 (FIG. 1) and another orifice 19 of the extractor plate 15 (FIGS. 8 and 9.). Moreover, the ring 16 is hollowed to define a groove and tongue joint 20 for the positioning of a block element 21 (FIG. 2) used, as set forth hereinafter, to dismantle and reassemble the gripping device.

This gripping device, with multiple functions, cooperates with the extractor plate 15, which, as shown in FIGS. 8 and 9, is provided with two flat rods 22 and 23. Each rod passes through a guide slot 24 made in this plate and its bent end 25 is embedded in a recess 26 for defining its position. The upper free end of the rod in question passes through a passage 27 defined by a shouldered cap 28 and is rendered fast, therebeyond, by force-fitting, with a spindle 29 projecting on both sides. A spring 30 is interposed between the extractor plate 15 and said cap 28 in which circular grooves for centering are hollowed. The spring 30 tends to apply this cap, when the mobile equipment containing the disk 10 is dismantled (FIG. 1) and even when the extractor plate 15 is removed (FIG. 9), against the spindle 29 and, when this equipment is coupled to the lid 4 by the gripping device 7 (FIGS. 2 to 5 and 10 to 18), against the bottom of the recess 6 in this lid. In the latter position, which is the most current, the shoulder of the cap 28 abuts against this recess bottom 6, whilst the actual cap is housed in a circular orifice 31 in said bottom; the spring is compressed and the spindle 29 is moved away therefrom. The spindles 29 of the two extractor rods 22 and 23 ensure the non-positive floating holding of the gripping device 7 described hereinafter both from the organic aspect and from the functional aspect.

As shown in particular in FIGS. 1 to 7, the gripping device 7 essentially comprises a pivot piece 32, a gripping handle 33 and a sliding pawl 34.

The pivot piece 32 presents a thick, flat shape defined by a bearing face 35, a rounded edge 36, a face 37 and an edge 38 which are free and visible. This piece comprises two slots 39 and 40 opening on the edge 36 and provided for the positioning and free movement of the rods 22 and 23. Each of the slots passes through a housing 41 extending on either side (FIG. 7) like the spindle 29 extends on either side of the corresponding rod 22 or 23. Each housing half comprises a part 42 substantially perpendicular to the bearing face 35 and opening on the two faces 35 and 37. This part 42 is extended by a return 43 which is directed towards the rounded edge 36, firstly straight then dipping towards the bearing face 35. The extreme end 44 of this return constitutes an open bearing. The two aligned bearings 44 located on either side of the corresponding slot 39 or 40 are adapted to receive the spindle 29 of the associated rod 22 or 23. The distance "D" to the rounded edge 36 from the opposite contact surface 44a of the bearings 44 is greater than the distance "d" to the bearing face 35 from the opposite contact surface 44b of the bearings 44.

The bottom of the recess 6 made in the lid is lined with a metal plate 45 (FIGS. 1 to 6) covering the two orifices 31 and defining windows 46, which are square for example, for the passage of the ends of rods 22, 23 and spindles 29. The plate 45 constitutes a rigid bearing and slide element for the pivot piece 32.

This pivot piece is, in fact, drawn elastically downwardly by the spindles 29 of the rods 22 and 23. It may then rest on the plate 45 by its bearing face 35 (FIG. 13) in the position for carrying (the ring 16 of the equipment bearing the disk 10 then being fixed to the container 1 by the or each magnet 3) or by its rounded edge 36 (FIG. 18) in the position for extraction (the lid 4 provided with the equipment bearing the disk 10 then being disconnected from the container 1 as the ring 16 is moved away from the or each magnet 3). It is because the distance "D" is greater than distance "d" that the passage from position for carrying (FIG. 13) to position for extraction (FIG. 18) makes it possible to lift the extractor plate 15, therefore to bring the disk 10 towards the lid 4 and thus move the locking plate 11 away, detaching its ring 16 from the or each magnet.

As shown in FIGS. 14 to 18, the passage from one extreme position to the other is accomplished during pivoting of the piece 32 of which the bearings 44 rise or lower on drawing or accompanying the spindles 29 in their vertical displacement coinciding with the coaxial displacement of the rods 22 and 23, whilst its rounded edge 36 slides on the plate 45. In fact, no positive connection is established between the pivot piece 32 and any one of the adjacent parts of the cartridge; it is rathermore a free floating assembly subjected only to the elastic traction of the spindles 29 of the rods 22 and 23.

As has already been indicated hereinbefore with reference to FIGS. 1 to 7, the gripping device 7 also comprises a handle 33 and a pawl 34.

Figure 6:
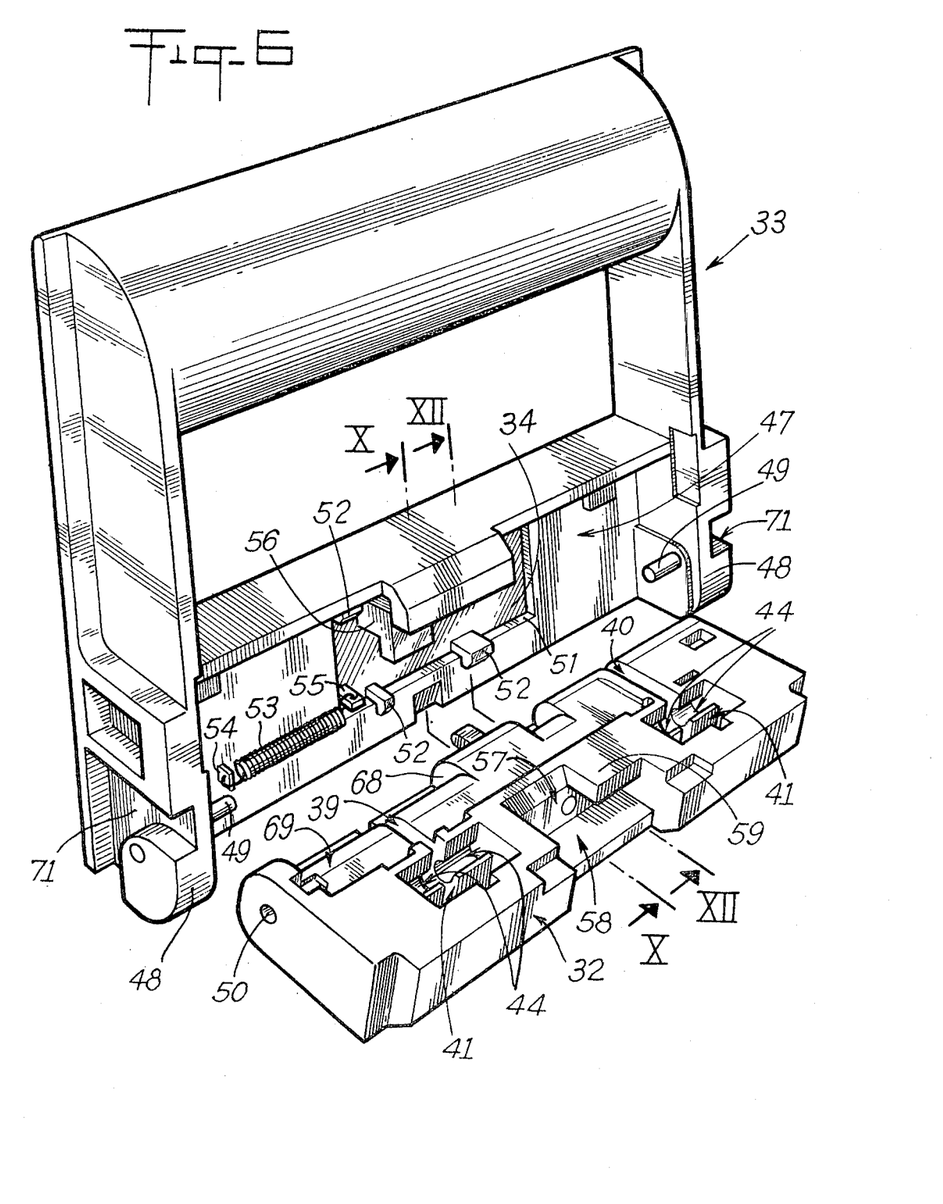
FIG. 6 is a perspective view defining, in synoptic view, the form of the pivoting piece, the handle and the sliding pawl in particular, as well as their connections.
Figure 13:
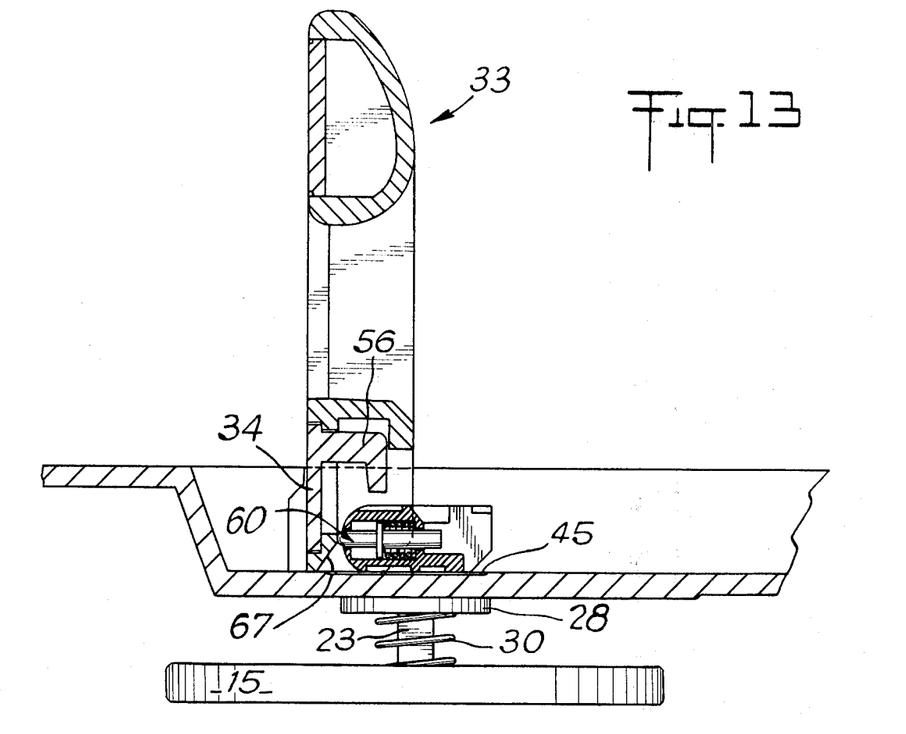
Figure 14:
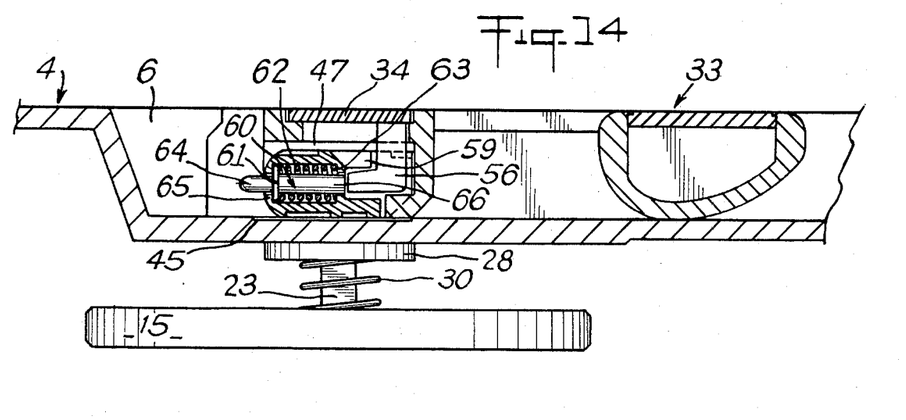
FIGS. 14, 15, 17 and 18 are part sections taken along line X—X of FIG. 6 across the locking push element
Figure 15:
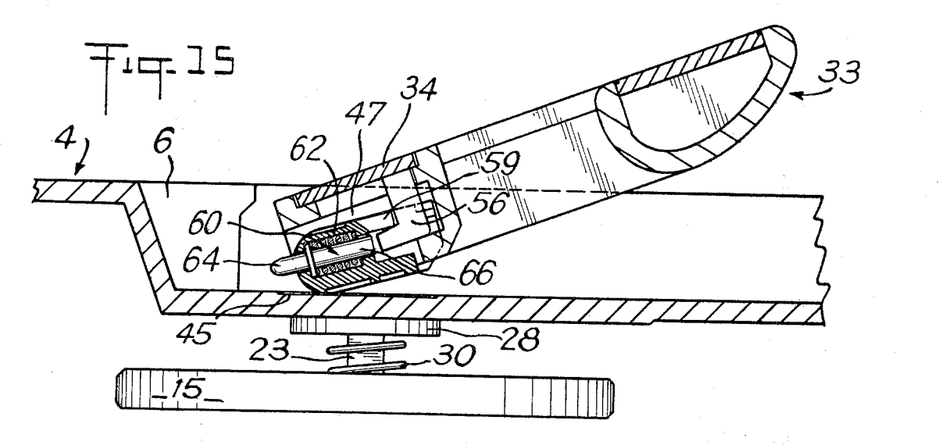
Figure 16:
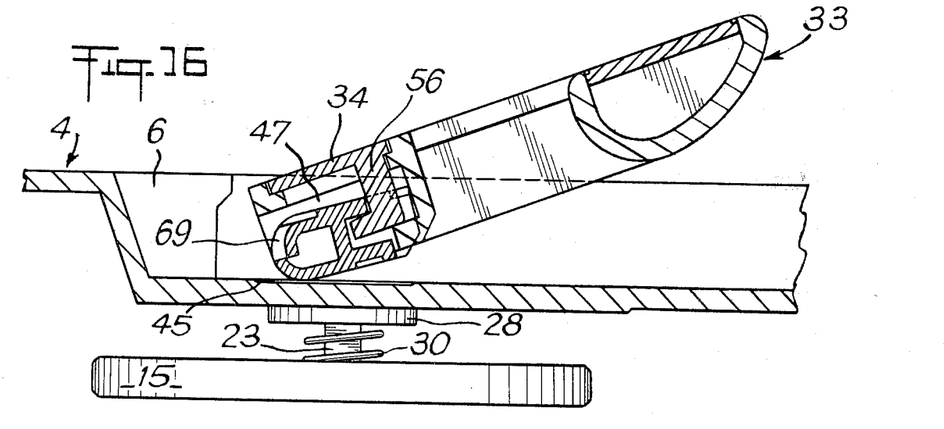
FIG. 16 is a part section taken along line XII—XII of FIG. 6 across a pawl-guiding element, these sections showing, by successive positions of the handle, the lifting of the handle for extraction of the disk and transport of the cartridge without its container.
Figure 17:
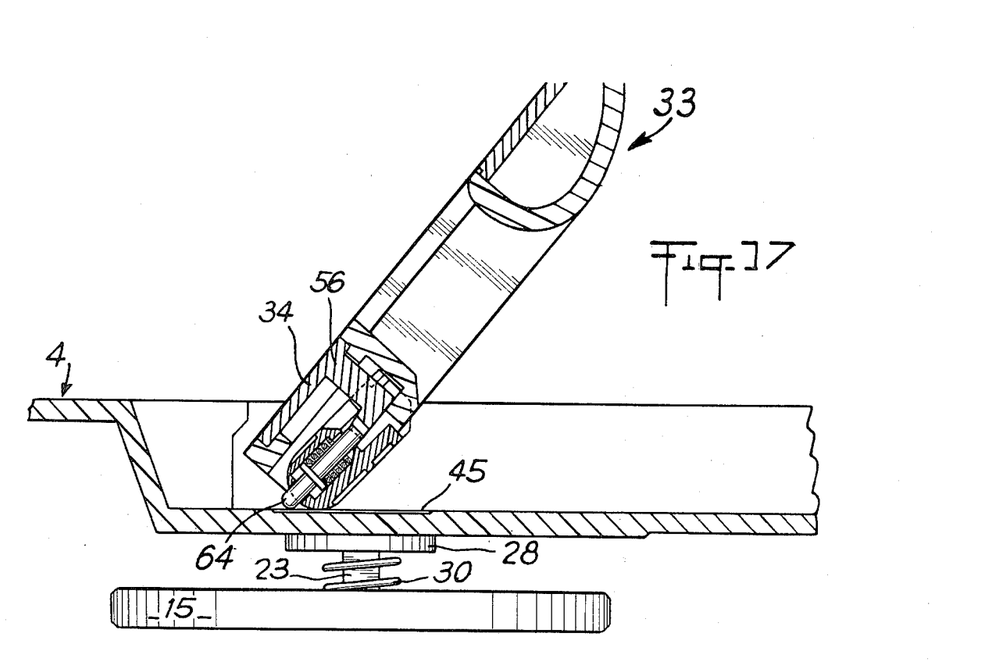

FIG. 6 clearly shows that the handle 33 defines a recess 47 in which the pivot piece 32 may take its place in coplanar manner (FIG. 18) or perpendicular (FIG. 13) to attain the above-mentioned positions of extraction and carrying respectively. This recess 47 is bordered by two lateral arms 48 of the handle which hold said piece 32 interposed therebetween; moreover, these arms are mounted to pivot, by means of pins 49 engaged in holes 50 in the piece, with respect to this handle and without any other connection with the adjacent parts of the cartridge. The holes 50 are made in said piece between its bearings 44 for extraction and its rounded edge 36 for pivoting. Thus, when the piece 32 is not coupled to the handle, it remains flat by its bearing face 35 on the plate 45 and said handle may pivot freely, as if it were articulated positively on the lid 4, between its retracted position (FIG. 10) and its position for gripping (FIG. 13). On the contrary, when the piece 32 is coupled to the handle by means described hereinafter (FIGS. 14 to 18), said handle can no longer pivot with respect to the spindles 49, but may pivot relatively to the lid 4 by sliding pivoting of the rounded edge 36 of the piece 32 with which it is fast, on the plate 45.

The coupling means mentioned hereinabove are controlled by the sliding pawl 34 and appear very clearly as a whole in FIG. 6. This pawl is constituted by a slide block mounted on the handle and covering, whatever the position which it occupies, a window 51 opening in the recess 47; projecting therefrom are subjacent guide hooks 52 cooperating with the transverse edges of the window 51 so that the pawl may be displaced by the operator's thumb parallel to the line of spindles 49.

A spring 53 hooked on catches 54 of the handle and 55 of the pawl tends to return said pawl elastically towards the position of disconnection illustrated in FIG. 6 in particular and materialised by stop of the catch 55 against an edge of the window 51. Furthermore, the pawl 34 is fast with an angle-shaped lug 56 located, in the above-mentioned position of disconnection, opposite a notch 57 allowing access to a groove 58 made in the pivot piece 32 under a counter-lug 59 for coupling. When the handle 33 is folded down towards the retracted position (FIG. 10), the lug 56 of its pawl penetrates in the notch 57 of the pivot piece 32 and is placed opposite the groove 58 thereof. When this pawl is then displaced in translation towards the right in FIG. 6 up to the position of coupling (FIG. 16), its lug 56 moves in the groove 58 and stops opposite the counter-lug 59 of the pivot piece 32. If the handle 33 is then lifted, maintaining the pawl 34 in this position of coupling, it takes said pivot piece along in its movement (FIGS. 16 to 18) due to the contact of the lug 56 and counter-lug 59.

Of course, it is preferable if the pawl 34 is locked in position of coupling as soon as lifting of the handle 33 begins and as long as it continues.

To this end, and as shown in FIGS. 6 and 14 to 18, a push element 60 is mounted to slide in the pivot piece 32 in a direction perpendicular to the line of holes 50 and consequently to the translation of the pawl. The push element 60 presents a projecting flange 61 on which acts a spring 62 abutting on a shoulder 63 of the piece 32. The spring tends to cause the control end 64 of the push element to project from the rounded edge 36 of said piece and until the flange 61 abuts against another shoulder 65 thereof. The control end 64 is adapted to cooperate with the plate 45 which tends to obliterate it during lifting of the piece 32 taken along by the handle due to the coupling made therebetween by the pawl 34. In the course of this obliteration, the locking end 66 of the push element, opposite the preceding one, projects into the groove 58 of the pivot piece 32 behind the lug 56 of the pawl brought into position of coupling. Thus, lifting of the handle 33 coupled to the pivot piece 32 by the pawl 34 is accompanied by an automatic locking of the latter and therefore of the piece by the push element 60.

Furthermore, it is desirable to be able to sensitize the position of gripping of the handle 33 disconnected from the pivot piece 32.

To this end, and as shown in FIG. 13, the control end 64 of the push element 60 cooperates with an inclined ramp 67 formed in the handle 33. The ramp makes it possible to retract this end 64 during lifting of said handle and the push element 60 then presses elastically on the latter, tending to maintain it in the lifted position.

Finally, it may be advantageous, in the case of the handle 33 being in lifted position for gripping and the pivot piece 32 in flat position for carrying (FIG. 13), to immobilise the pawl 34 in position of disconnection (FIG. 6) in order to avoid any false manoeuvre with the thumb when the handle is folded down.

To this end, with reference to FIG. 6, the guide hood 52 located in the lower left-hand corner of this Figure, may meet, in the situation defined hereinabove, a stop 68 of the piece 32; this stop is constituted by one of the ends of a recess 69 (FIGS. 6 and 16) made in the rounded edge 36 of said piece for the spring 53 not to hinder the relative pivoting between the handle and this piece.

In order to understand the invention clearly, it is essential to consider above all the assembly of the gripping device on the cartridge, which is illustrated by FIGS. 1 to 7.

Figure 2:
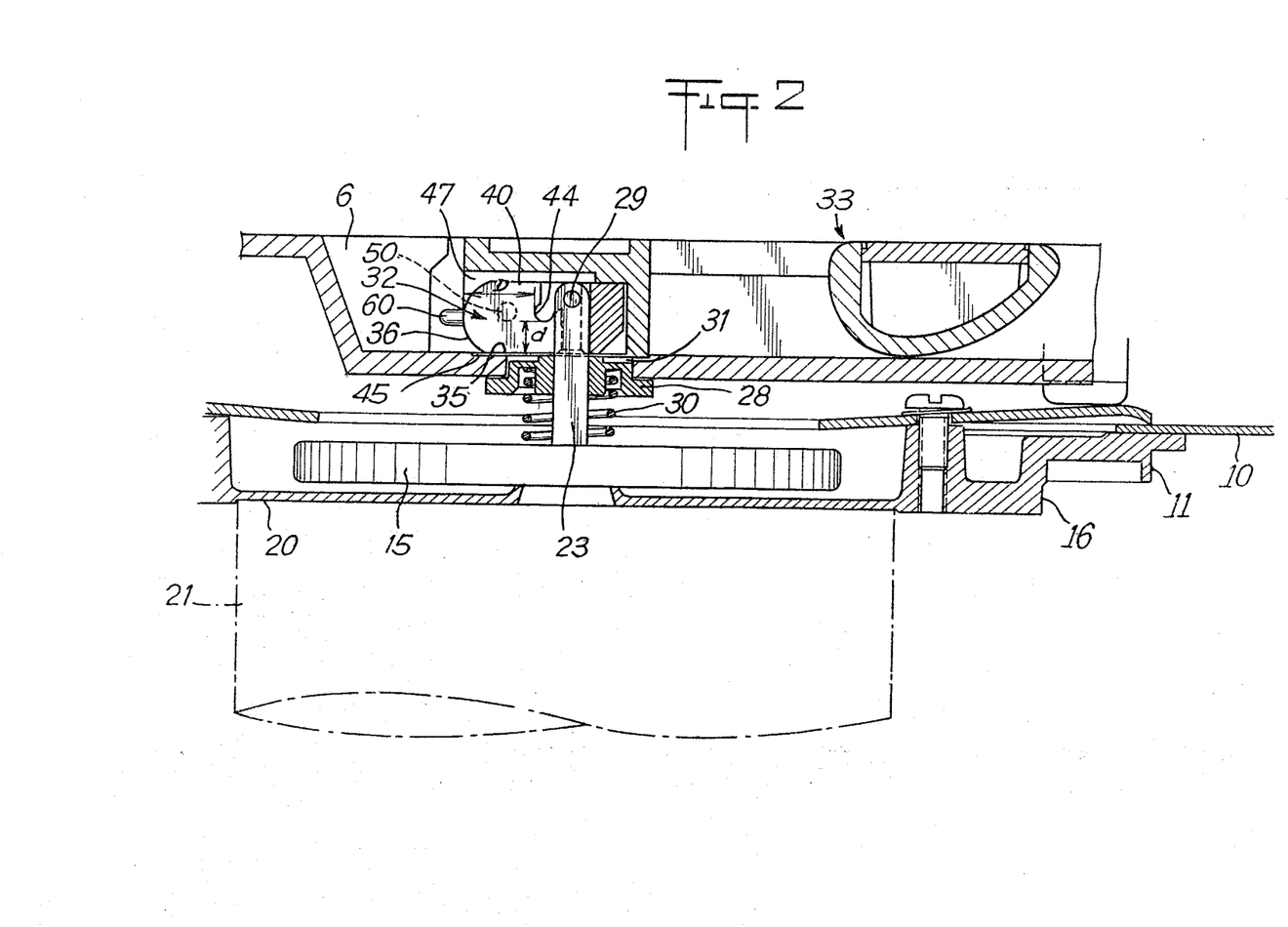
FIGS. 2 to 5 are part sections similar to FIG. 1, but taken on a larger scale in a plane perpendicular to the axis of pivoting of the handle and passing through one of the rods of the extractor plate, these views illustrating the assembly of the gripping device during assembly of the cartridge.
Figure 3:
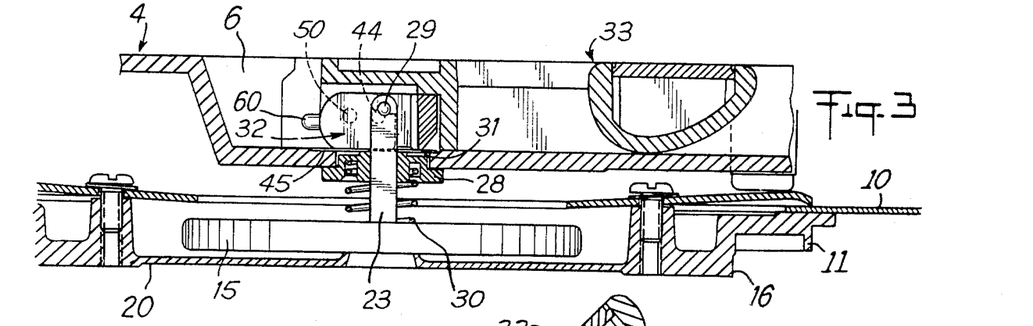
Figure 4:
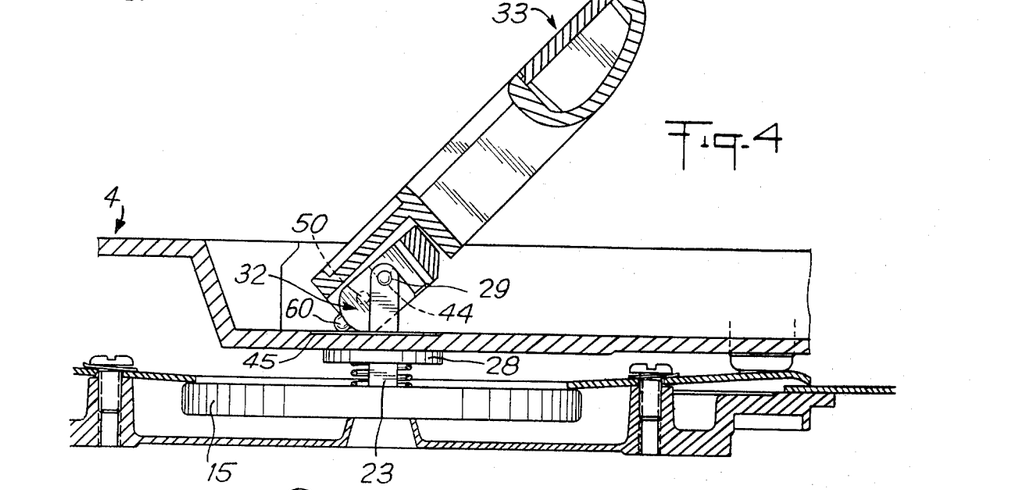
Figure 5:
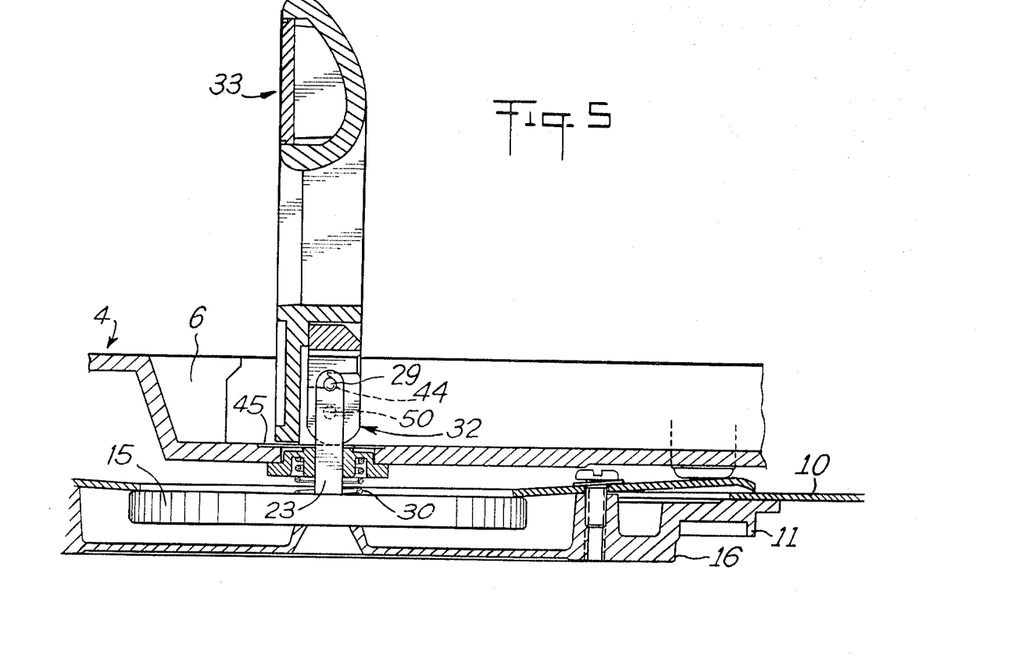

As shown in FIG. 2, the mobile equipment carrying the disk 10 rests, by the groove and tongue joint 20 of the ring 16, on a block element 21.

The lid 4 is then positioned relatively to this mobile equipment so that the caps 28 thereof are fitted in the orifices 31 in the bottom of recess 6.

The metal plate 45 is placed on this bottom, fitting its windows 46 on the rods 22 and 23 with spindles 29.

The assembly constituted by the handle 33 and the pivot piece 32 completely embedded in the recess 47, is then centred with respect to said rods so that the latter and their spindles penetrate without any difficulty in the rising parts 42 of the housings 41 of said pivot piece.

Of course, such a centering would be relatively delicate due to invisibility if a means for facilitating it were not provided. This means may be seen in FIGS. 1 and 6; it consists in providing a centering catch 70 projecting in the recess 6 of the lid on each of its sides (FIG. 1); these two catches are aligned parallel to the line of axes 50; they cooperate with grooves 71, sectioned at right angles, hollowed in the side arms 48 of the handle and opening on the ends thereof; a sufficient clearance is arranged between the catches 70 and the grooves 71 so as to allow centering but so as not to oppose the movement of pivoting of the handle.

Figure 7:
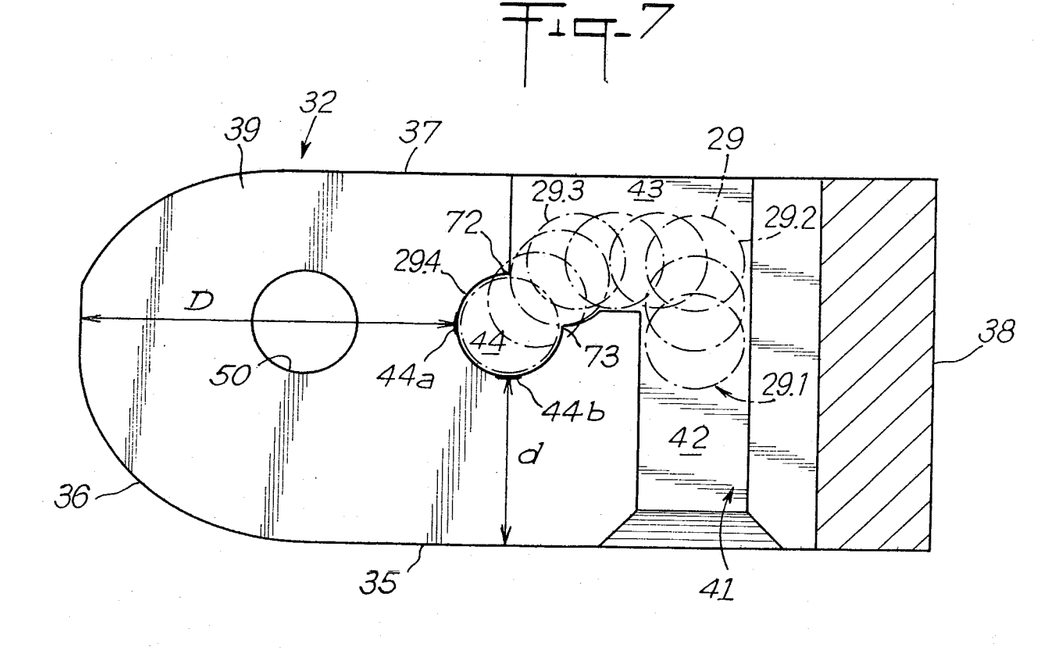
FIG. 7 is a much enlarged transverse section through the pivoting piece showing, during the above-mentioned assembly, the path of an extractor rod spindle in the corresponding housing—and its bearing—of said piece.

The assembly 32-33 being centred with respect to the lid 4, the extraction rods 22 and 23 extend in the parts 42 of the housings 41 of the pivot piece 32 so that the spindles 29 of these rods are at level 29.1 (FIG. 7).

A pressure is then exerted on the assembly 32-33 so that the springs 30 are compressed and the spindles 29 thus come into housings 41 at the upper level 29.2 (FIG. 7) corresponding to that of the returns 43 of said housings. The different elements constituting the gripping device then occupy the relative positions illustrated in FIG. 2. A translation of the assembly 32, 33 is then made relatively to the lid 4 so that said spindles 29 follow the returns 43 from position 29.2 towards position 29.3 (FIG. 7), the different constituent elements of the gripping device now being found in the position shown in FIG. 3.

At this stage of the description, it is very important to note that each return 43 presents, in its descending part, a constriction defined by two elastically deformable noses 72 and 73, as may be clearly seen in FIG. 7; these noses define the above-mentioned bearings 44. The pivot piece 32 is advantageously constituted by plastics material which, due to its nature, gives a sufficient elasticity to the noses 72 and 73. The spindles 29 being in position 29.3, coupling of the pivot piece 32 with the handle 33 is then effected by means of the pawl 34 and lifting of said handle is controlled concomitantly for the pivot piece 32 to straighten by abutting by its edge 36 on the plate 45 and provoke penetration of the spindles 29 in the bearings 44 forcing the noses 72 and 73 in a clipping manner, the spindles then passing between position 29.3 and position 29.4 (FIG. 7). The component elements of the gripping element occupy the successive relative positions illustrated in FIGS. 4 and 5.

To dismantle the gripping device, the above-mentioned operations must be carried out in reverse, knowing, however, that the folding down of the handle 33 has no effect. The mobile equipment carrying the disk 10 being hooked to the gripping device 7 embedded in the recess 6 in the lid 4 and the ring 16 being placed on the block element 21, it suffices to exert on the handle 33 a sufficient pressure to compress the springs 30 and disengage the spindles 29 from the bearings 44, elastically forcing the noses 72 and 73. This downward pressure must be accompanied by a translation of the handle towards the bottom of the recess and a release of the effort, in which case the spindles 29 pass from position 29.4 to position 29.1, passing through the significant intermediate positions 29.3 and 29.2. A simple removal of this device 7 enables it to be disengaged from the rods 22, 23 with spindles 29. On lifting the lid, the mobile equipment carrying the disk 10 is entirely released.

It will be readily appreciated that the invention makes it possible to assemble the cartridge and more especially the gripping device thereon easily, rapidly, by any one and without tools; the functioning of this gripping device either for lifting the cartridge as a whole or for extracting the disk 10 from the container (FIGS. 14 to 18) will now be readily understood.

Figure 10:
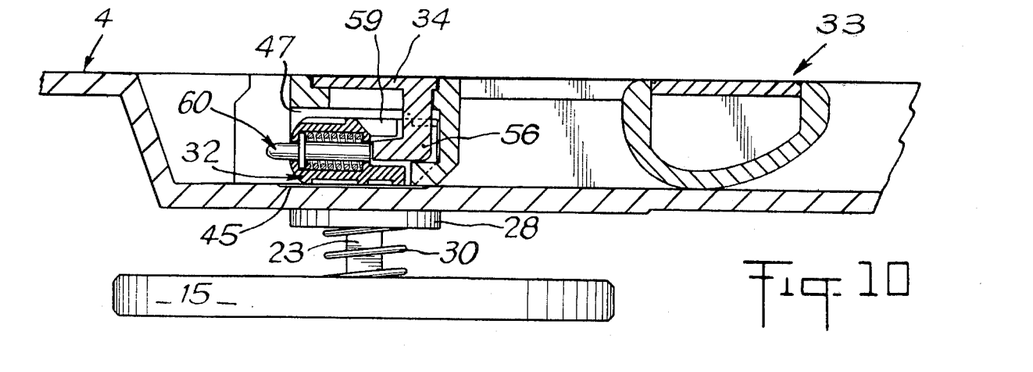
FIGS. 10, 11 and 13 are part sections taken along X—X of FIG. 6 across the locking push element
Figure 11:
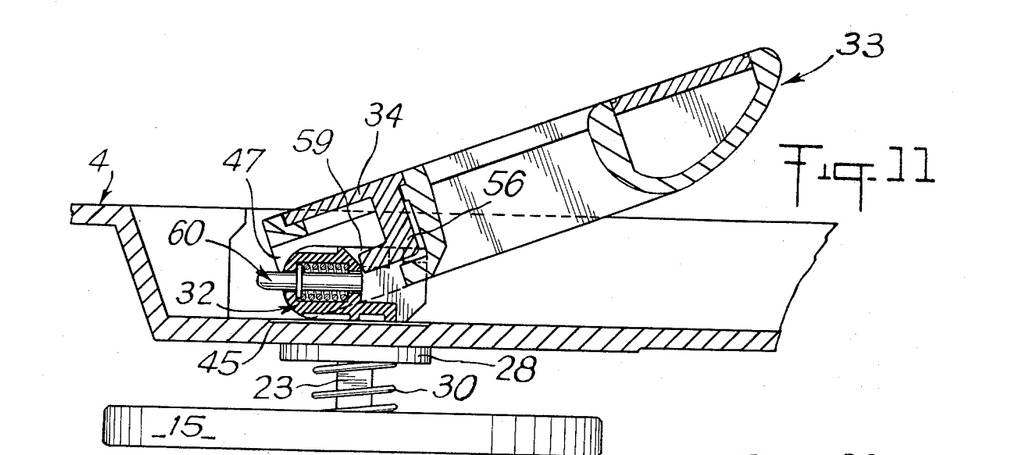
Figure 12:
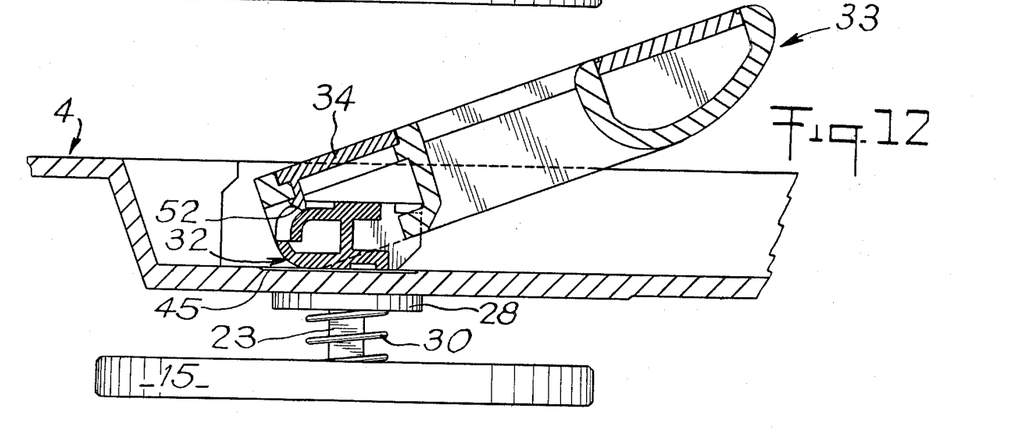
FIG. 12 is a part section taken along line XII—XII of this FIG. 6 across a pawl-guiding element, these sections illustrating, by successive positions of the handle, the lifting of the latter for transporting all the cartridge.

To lift the cartridge as a whole (FIGS. 10 to 13), the operator abstains from acting on the pawl 34 so that the pivot piece 32 remains disconnected from the handle 33 and it conserves the position illustrated in FIG. 10, position in which the bearing face 35 rests on the plate 45, the extractor disk 15 does not urge the mobile equipment carrying the disk 10 upwardly and the ring 16 of this equipment adheres magnetically to the or each magnet 3 of the container 1. On lifting the handle 33, all the component elements remain in place (FIGS. 11 and 12) and only said handle pivots by its spindles 49 in the holes 50 of the piece 32 remaining fixed. At the end of pivoting (FIG. 13), the handle is completely lifted and its position is substantially defined by the elastic push element 60.

Figure 18:
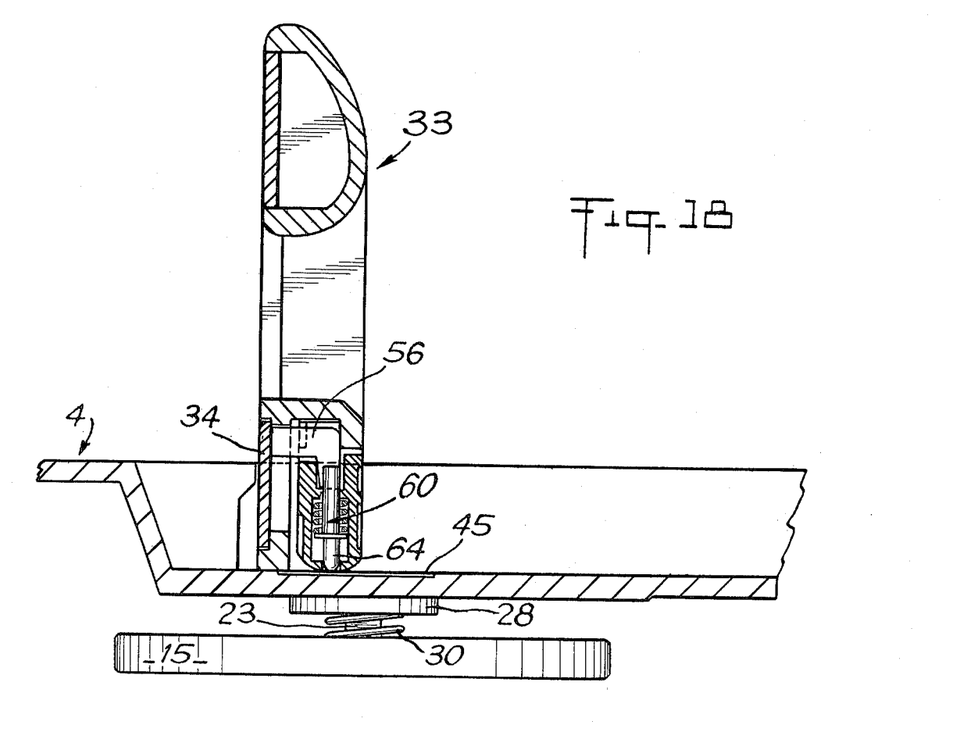

To extract the disk 10 from the container 1 (FIGS. 14 to 18), the operator pushes on the pawl 34 in order to couple the pivot piece 32 to the handle 33 by its lug 56 cooperating with the counter-lug 59. Without releasing the push element, he/she lifts said handle 33 until the control end 64 is driven in by the plate 45 and causes the locking end to project behind the lug 56 (FIGS. 14 to 17). The operator may then release the pawl since it is locked in coupling position, but he/she must continue to lift the handle up to the vertical position for gripping (FIG. 18).

In the course of this lifting which is shown in detail in FIGS. 14 to 18, the pivot piece 32 pivots at the same time as it slides by its rounded edge 36 on the plate 45, so that its bearings 44 lift the spindles 29 vertically and draw the rods 22 and 23 upwardly, the effect of which is to lift the mobile equipment carrying the disk 10 relatively to the bottom 2 of the container 1 and thus detach the ring 16 from the or each magnet 3.

The handle being completely lifted (FIG. 18), the disk 10 may be extracted without any difficulty from the container 1 by raising it.

The invention is not limited to the embodiment described and shown in detail as various modifications may be made thereto without departing from the scope thereof.

What is claimed is:

1. For use with a magnetic disc cartridge of the type which comprises a container, a lid, and a magnetic disc assembly, said disc assembly defining a central cavity containing a magnetic disc held between a clamping plate and a locking plate, said container including a base having magnet means for removable connection with said disc assembly, said disc assembly including an extractor plate movably mounted between said clamping and locking plates, said extractor plate including at least one rod projecting through said disc, said rod including a spindle extending parallel to said disc, and spring means biased between said extractor plate and said spindle, the improvement which comprises a device for carrying, extracting, and reclosing said cartridge, said device comprising a handle, a pivot piece of resilient material pivotedly received in said handle, a pawl movably mounted on said handle, said pawl being shiftable between a first position whereat said pawl and handle are coupled for conjoint movement and a second position whereat said pawl and handle are relatively pivotal, a clearance slot generally in the configuration of an inverted L formed in said pivot piece, said slot including an open entrance end and a blind end defining a bearing, said handle including a clearance opening aligned with said entrance end of said clearance slot, a constricted portion formed in said slot adjacent said bearing, the cross sectional extent of said constricted portion in the unstressed condition thereof being less than the cross sectional dimension of said spindle, whereby said spindle may be removably retained in said bearing by forcibly urging said spindle through said constricted portion and into said bearing, a first stop surface formed on said pivot piece and disposed a first distance from the axis of said bearing, a second stop surface formed on said pivot piece and disposed a second and greater distance from said axis of said bearing, said extractor plate being shifted to releasing position of said container when said spindle is in said bearing and said second stop surface engages said lid and being in locking position of said container when said first stop surface engages said lid, said spring means yieldably maintaining said lid against the stop surface engaging said lid.

2. A device in accordance with claim 1 wherein said extractor plate includes two opposed and relatively spaced said spindles in coaxial alignment, and said pivot piece includes two said clearance slots terminating in coaxially disposed said bearings adapted to receive said spindles.

3. Apparatus in accordance with claim 2 wherein said rods are flat in transverse section in the area beneath said spindles.

4. Apparatus in accordance with claim 1 and including a spring member biased between said pawl and said handle and urging said pawl toward said second position, the combination including latch means for locking said pawl in said first position against the influence of said spring member.

5. Apparatus in accordance with claim 4 wherein said latch means comprises a push element mounted on said pivot piece, said push element being shifted to said locking position of said pawl responsive to movement of said pivot piece to engage said second stop surface against said lid.

* * * * *